Patented May 20, 1924.

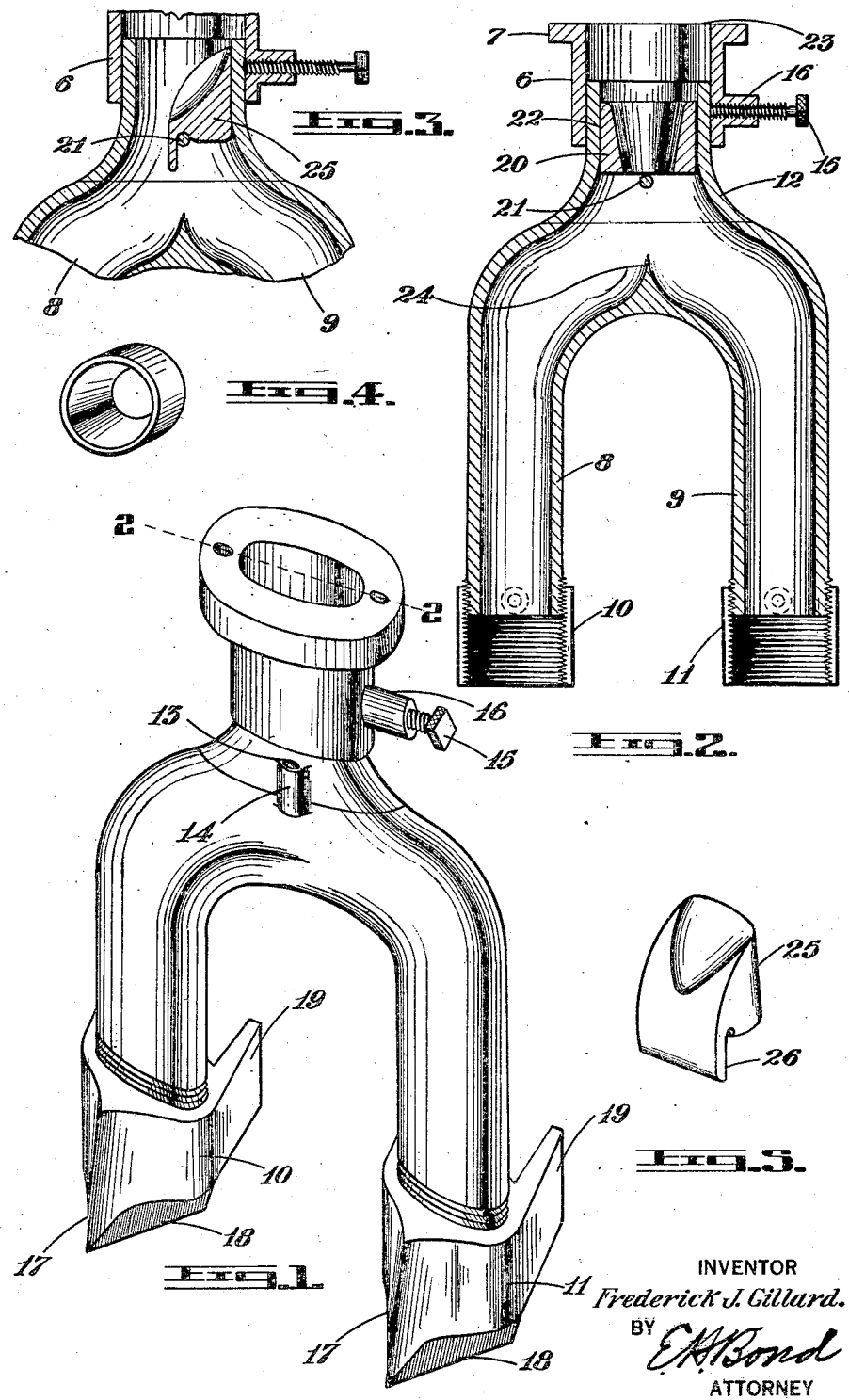

1,494,351

UNITED STATES PATENT OFFICE.

FRÉDÉRICK JOSEPH GILLARD, OF KELOWNA, BRITISH COLUMBIA, CANADA.

SEEDING MACHINE.

Application filed March 16, 1922. Serial No. 544,339.

*To all whom it may concern:*

Be it known that I, FRÉDÉRICK JOSEPH GILLARD, a citizen of the Dominion of Canada, residing at Kelowna, in the county of Yale and Province of British Columbia, Canada, have invented certain new and useful Improvements in Seeding Machines, of which the following is a specification.

The present invention relates to improvements in seeding machines and more particularly pertains to drills appurtenant thereto. The primary object of my invention is to provide a drill for seeding machines constituting tandem tubes having shoes disposed on the lower extremities thereof and converging from one throat, which drill and shoes may be adjusted to discharge in double or single rolls.

Among other aims and objects of my invention residing in the disclosure may be cited the provision of a seeding drill of the character described with a view to compactness and durability, wherein the number of parts are few, the construction simple, and the cost of production low.

With these and other objects in view, the invention consists in the construction, combination and arrangement of parts as will be hereinafter fully described, illustrated in the accompanying drawings and pointed out in the claims hereunto appended.

Figure 1 is a perspective view of a seed drill constructed in accordance with my present invention.

Figure 2 is a vertical section as it would appear when taken on line 2—2 of Figure 1.

Figure 3 is a fragmentary detail showing the position of the switch member incorporated in my present construction.

Figure 4 is a perspective view of the evener incorporated in this invention and

Figure 5 is a perspective view of the cut off member shown in Figure 3.

Referring to the drawings in detail, wherein like numerals of reference designate corresponding parts, the numeral 6 designates a cylindrical member provided with the peripheral flange 7 adapted for attachment to a like flange carried by the drill tubes of a seeding machine. The tubes 8 and 9, supporting the threadedly mounted shoes 10 and 11, diverge from the throat 12 which is detachably connected thereto, as best shown in Figure 1. The throat 12 is connected to the tubes 8 and 9 through the medium of diametrically opposed set screws 13 seating in bosses 14. The cylindrical member 6 is secured in position by the set screw 15 disposed in the boss 16, the inner terminal of which abuts against the throat 12.

The shoes, generally designated by the numerals 10 and 11, are provided with cutting edges 17, and rearwardly extending side walls 19 which hold the earth back during the time required for the seed to fall into the furrow.

An evener, denoted by the numeral 20, is disposed in the throat 12 of the shoe drill, being held in position by the transverse pin 21. The outer circumferential periphery 22 of the evener is of cylindrical formation complying with the inner contour of the throat 12. The aperture 23 disposed therein is of frusto conical formation. Seed flowing from the seed tubes carried by the seed machine flows through the apertures 23 disposed in the evener 20. Seed passing through the aperture 23 due to the instrumentality of the frusto conical formation, will be confluent at the apex of the dividing ridge 24 upon which it is adapted to impinge. The fallen seed will be equally distributed into the tubular members 8 and 9 through this medium.

In Figure 3, I have shown a switch member, whereby it is permissible to conduct the flow of seed to either tubular members 8 or 9 independently. This switch member 25 is held in position by the pin 21, also shown in Figure 2. 26 is a downwardly extending lip from the inner side of the switch member 25 and acts as a positive guide for all seeds into the desired tubular member 8 or 9, even though they may hit the inner side of the neck 12 and bounce back centrally thereof.

From the foregoing, it is thought that the construction of my invention will be clearly understood and, therefore, a more extended explanation has been omitted.

What I claim as new is:

1. A shoe drill attachment to a seeding machine, comprising a member, tubes having a common throat held in said member, a pin extended transversely of said throat, and a switch member in said throat and supported on said pin and having a downwardly extended lip.

2. A shoe drill attachment to a seeding machine, comprising a member, tubes having a common throat held in said member, a switch member in said throat having a downwardly extended lip, and a pin extended across said throat and supporting said switch member, said switch member having a transverse recess at the upper end of said lip to receive said pin.

In testimony whereof, I affix my signature in the presence of two witnesses.

FRÉDÉRICK JOSEPH GILLARD.

Witnesses:
    IAN MacRae,
    D. Hattersbury.